United States Patent [19]
Hsu et al.

[11] Patent Number: 5,365,368
[45] Date of Patent: Nov. 15, 1994

[54] EFFICIENT BI-DIRECTIONAL OPTICAL FIBER AMPLIFIER FOR MISSILE GUIDANCE DATA LINK REPEATER

[75] Inventors: Hui-Pin Hsu, Northridge; Ronald B. Chesler, Woodland Hills, both of Calif.

[73] Assignee: Hughes Aircraft Company, Los Angeles, Calif.

[21] Appl. No.: 174,929

[22] Filed: Dec. 29, 1993

Related U.S. Application Data

[63] Continuation of Ser. No. 937,802, Aug. 28, 1992, abandoned.

[51] Int. Cl.$^5$ .......................... H04B 9/00; H04L 9/02
[52] U.S. Cl. ..................... 359/341; 359/134
[58] Field of Search ........... 359/134, 143, 152, 160, 341

[56] References Cited

U.S. PATENT DOCUMENTS

| | | | |
|---|---|---|---|
| 4,551,829 | 11/1985 | Dragoo et al. | 359/341 |
| 4,648,083 | 3/1987 | Giallorenzi | 359/160 |
| 4,674,830 | 6/1987 | Shaw et al. | 350/96.15 |
| 4,700,339 | 10/1987 | Gordan et al. | 359/134 |
| 4,709,413 | 11/1987 | Forrest et al. | 359/341 |
| 4,867,518 | 9/1989 | Stamnitz et al. | 359/134 |
| 4,901,330 | 2/1990 | Wolfram et al. | 372/75 |
| 4,959,837 | 9/1990 | Fevrier et al. | 372/6 |
| 5,005,175 | 4/1991 | Desurvire et al. | 372/6 |
| 5,005,930 | 4/1991 | Schotter | 350/96.1 |
| 5,012,991 | 5/1991 | Pinson | 244/3.12 |
| 5,027,079 | 6/1991 | Desurvire et al. | 330/4.3 |
| 5,058,103 | 10/1991 | Shimizu | 359/152 |
| 5,063,595 | 11/1991 | Ballance | 380/48 |
| 5,084,779 | 1/1992 | Stanley | 359/152 |
| 5,087,108 | 2/1992 | Grasso et al. | 385/27 |
| 5,140,598 | 8/1992 | Tagawa et al. | 372/6 |

OTHER PUBLICATIONS

Shimada, S.; Optics and Photonics News, Jan. 1990, pp. 6–12.
"Impact of Erbium-doped amplifiers on optical communication systems," S. Shimada, Optics & Photonics News, Jan. 1990, pp. 6–11.
"Analysis of noise figure spectral distribution in erbium doped fiber amplifiers pumped near 980 and 1480 nm," E. Desurvire, Applied Optics, vol. 29, No. 21, 20 Jul. 1990, pp. 3118–3125.
"All-Fibre, Diode-Pumped Recirculating-Ring Delay Line," 8030 Electronics Letters 24 (1988) 12 May, No. 10, Stevenage, Herts., Gr. Britain.

*Primary Examiner*—Nelson Moskowitz
*Attorney, Agent, or Firm*—Charles D. Brown; Randall M. Heald; Wanda K. Denson-Low

[57] ABSTRACT

A bi-directional erbium doped fiber (EDF) optical fiber amplifier (50) employing two separate EDF amplifier channels (52, 62) for two counter-propagating signals allows the optimization of each individual signal channel for efficient bi-directional optical signal repeater performance. The pump sources (53, 63) for each EDF channel (52, 62) can be switched on and off independently, to serve as an in-line signal switch, without affecting another signal channel.

19 Claims, 2 Drawing Sheets

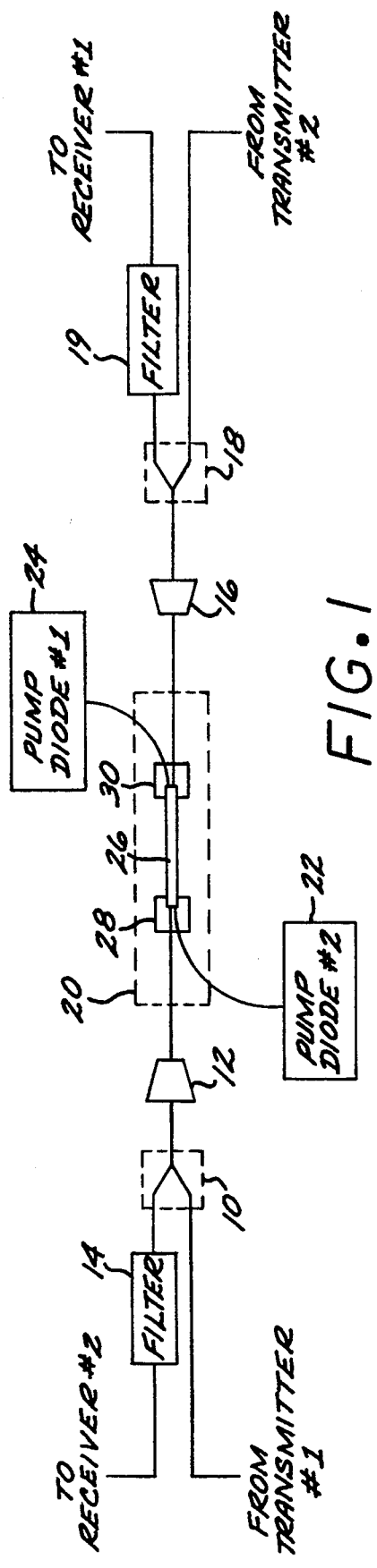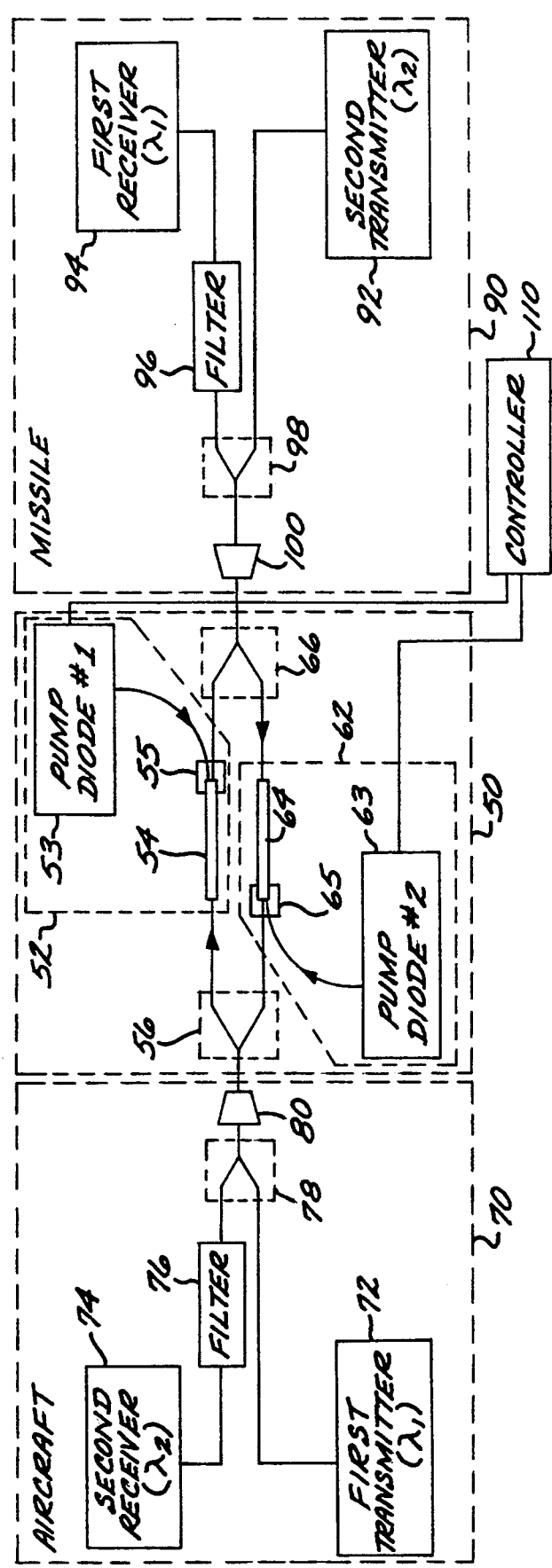
FIG. 1
FIG. 2

EFFICIENT BI-DIRECTIONAL OPTICAL FIBER AMPLIFIER FOR MISSILE GUIDANCE DATA LINK REPEATER

This is a continuation of application Ser. No. 07/937,802, filed Aug. 28, 1992, now abandoned.

BACKGROUND OF THE INVENTION

The present invention relates to optical fiber amplifiers, and more particularly to an efficient bi-directional optical fiber amplifier.

The realization of an optimized high efficiency bi-directional optical fiber amplifier is essential for the development of long range fiber optic data links ("FODL") for powered weapon system guidance. Applicable systems include air-to-ground or surface-to-surface missiles of extended range as well as long range land combat missiles. One exemplary such application is described in U.S. Pat. No. 5,005,930, for "Multi-Directional Payout Fiber Optic Canister," D. K. Schotter, and assigned to a common assignee with the present application. The entire contents of that patent are incorporated herein by this reference. Other potential applications for military systems include unmanned ground vehicle (UGV) and unmanned undersea vehicle (UUV). Potential commercial applications include long range radar and bi-directional satellite ground station relay links, CATV head-end link and fiber to the home (FTTH) fiber optics systems.

Erbium doped fiber (EDF) can be used to amplify optical signals in the 1.53–1.58 $\mu$m band by converting pump lasers operating at a wavelength of 1.48 $\mu$m or 0.98 $\mu$m into signal power. For a long haul bi-directional fiber optics link, typically over 100 kilometers in length, a prior design of an optical signal amplifier operates by a single strand of EDF and suffers possible input signal level dependence, near-end reflection and in-line optical feedback induced noise, as well as cross-channel cross talk.

FIG. 1 illustrates a design for an EDF bi-directional optical fiber amplifier 20 employing a single strand of EDF, of the type described in commonly assigned pending application Ser. No. 07/655,615, filed Feb. 15, 1991, entitled "Amplifier for Optical Fiber Communication Link," by Hui-Pin Hsu, Ronald B. Chesler and Gregory L. Tangonan, now abandoned, the entire contents of which are incorporated herein by this reference. This design employs two signals and two diode laser pumps (22 and 24) coupled together by couplers 28 and 30, propagating in the same EDF gain medium (EDF 26). In the system of FIG. 1, an input signal at a first wavelength $\lambda_1$ from a first transmitter enters a wavelength division multiplexing ("WDM") coupler 10, and is sent via a long length of optical fiber on a fiber bobbin 12 to the amplifier 20. The amplifier 20 amplifies the signal at the first wavelength, and sends it through another long length of optical fiber on a second fiber bobbin 16 to a second WDM coupler 18. The coupler 18 sends the signal at the first wavelength through a narrow band optical filter 19 centered at $\lambda_1$, and on to a first receiver. A second transmitter sends a second input signal at a second wavelength $\lambda_2$ into the second WDM coupler 18 and through the second long length of optical fiber on bobbin 16 to the bi-directional amplifier 20. The amplifier 20 amplifies the second input signal and sends it via the optical fiber on the first bobbin 12 to the first WDM coupler 10, which separates this signal from the first input signal and sends it via a narrow band optical filter 14 centered at $\lambda_2$ to the second receiver. The filter 14 rejects light at the first wavelength $\lambda_1$; the filter 19 rejects light at the second wavelength $\lambda_2$.

The first transmitter, second receiver, optical filter 14 and WDM coupler 10 may be carried by the master vehicle, e.g., a manned airborne vehicle, and the second transmitter, first receiver, the WDM coupler 18, and the filter 19 can be carried on a slave vehicle such as a missile.

Drawbacks of the single channel EDF design of FIG. 1 include:

1) It is difficult to optimize the EDF length to accommodate wide input signal variations which dictate the EDF length for maximum signal gain. When the EDF 26 is too long, unwanted attenuation reduces the signal gain. When the EDF length is too short, both amplified signals will not be able to realize the full signal gain allowed. In contrast, the new dual-arm EDF design in accordance with this invention allows each EDF to be optimized individually for one signal channel for maximum saturable gain. This makes the optimum length of EDF less sensitive to the input signal level.

2) Single strand EDF amplifier designs cannot provide the switch-off option for individual signal channels for the bi-directional link.

3) Single strand EDF amplifiers will incur higher noise figure (NF) due to the presence of a co-directional pump.

4) Single strand EDF amplifiers will also suffer cross-channel cross talk when one of the signal channels is operated at a low data rate of less than 100 Hz, due to the depletion of excited state population for the stimulated emission signal gain.

It is therefore an object of the present invention to provide a bi-directional EDF optical amplifier employing two separate EDF channels for counter-propagating signals to allow the optimization of each individual signal channel for efficient bi-directional optical signal repeater performance.

SUMMARY OF THE INVENTION

An optimized high efficiency bi-directional optical fiber amplifier employing erbium doped fibers (EDF) is described. In a general sense, the amplifier is characterized by first and second separate, unidirectional EDF amplifier channels for two respective counter-propagating signals, thereby permitting optimization of each individual amplifier channel for efficient bi-directional optical signal performance.

The counter-propagating signals are at respective first and second different wavelengths $\lambda_1$ and $\lambda_2$. The amplifier further comprises wavelength selective means for maintaining separation between the signals of different wavelengths so that only signals of the first wavelength traverse the first amplifier channel and only signals of the second wavelength traverse the second amplifier channel. The wavelength selective means includes first and second signal routing wavelength division multiplexing (WDM) optical couplers for separating the signals into signal components at the first and second wavelengths. The first coupler is coupled to the first ends of the EDFs, and the second coupler is coupled to the second ends of the EDFs.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 illustrates a conventional design for an EDF bi-directional optical fiber amplifier.

FIG. 2 illustrates an EDF bi-directional optical fiber amplifier embodying this invention.

DETAILED DESCRIPTION OF THE PREFERRED EMBODIMENT

Figure 3:
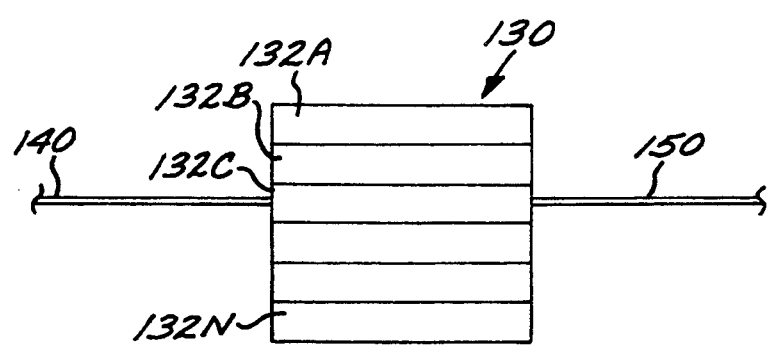
FIG. 3 illustrate an exemplary semiconductor optical amplifier connected to respective optical fibers as an alternate to EDF optical amplifiers.

A high efficiency, switchable, bi-directional fiber amplifier 50 embodying the present invention is illustrated in FIG. 2. The bi-directional fiber amplifier 50 comprises two separated optical fiber amplifiers 52 and 62 and a pair of signal routing wavelength division multiplexing (WDM) couplers 56 and 66, which route a weak incoming and an amplified output signal to or from the two fiber amplifier arms 52 and 62. Each uni-directional fiber amplifier arm 52 and 62 has a counter-propagating pump (to the signal) source 53 or 63, respectively, a pump/signal WDM coupler 55 or 65 for necessary pump and signal routing, and an optical fiber amplifier 54 or 64 which can be, for example, a section of erbium doped fiber (EDF) for 1.55 micron signal amplification, or other rare-earth doped fiber for the amplification of other signal wavelengths. By way of example, one of amplifiers 54 and 64 can be an EDF for operation at 1.5 micron, and the other amplifier fiber can be doped with neodymium (Nd) for operation at 1.3 micron.

The amplifier 50 is employed in this embodiment in a long-haul optical fiber data link between a first airborne vehicle 70 and a second airborne vehicle 90. In this exemplary application, the first vehicle 70 is the master vehicle, e.g., a manned aircraft, and the second vehicle is a slave vehicle, e.g., a guided missile or other unmanned vehicle. Data is exchanged between the vehicles 70 and 90 via the optical data link.

A first transmitter 72 operating at a first optical wavelength $\lambda_1$ is located on the first vehicle 70 with a second receiver and a narrow band optical filter 76 centered at the optical wavelength of the second transmitter $\lambda_2$. A first WDM coupler 78 is also located on the vehicle 70 with a fiber bobbin 80, around which a long length of optical fiber is wound. Typical values for $\lambda_1$ and $\lambda_2$ are 1500 and 1530 nm, providing a wavelength separation of 30 nm between the two operating wavelengths.

A second transmitter 92 operating at a second optical wavelength $\lambda_2$ is located on the second vehicle 90 with a first receiver 94 which receives optical signals at the first wavelength $\lambda_1$ and a second optical narrow band filter 96 centered at the first optical wavelength. A second WDM coupler 98 is also located on the second vehicle 90 with a second fiber bobbin 100, around which a long length of optical fiber is wound.

In this exemplary application, the amplifier 50 is disposed at the center of the long-haul optical fiber data link, and serves to amplify the optical signals transmitted from either said first or second vehicle 70 or 90. After the missile 90 is launched from the aircraft 70, optical fiber pays out from both fiber bobbins 80 and 100 to maintain the continuity of the optical data link between the vehicles.

Unlike the single arm optical amplifier design shown in FIG. 1, the two-arm amplifier 50 of FIG. 2 allows each amplifier 52 and 62 to be optimized for a specific signal by selecting the length and dopant of each fiber amplifier 54 and 64 and the pump diode wavelength and power of pump sources 53 and 63. Also, interference from the counter-propagating signal that may deplete the signal gain and/or cause unwanted cross-talk is avoided. Furthermore, the two signal channels can be amplified selectively by controlling the two pump sources 53 and 63 individually. This allows the two-arm amplifier 50 to serve as an optical switch in certain bi-directional optical links where there is accessed control to the unit, such as in cascaded FTTH applications. In such applications, a controller such as controller 110 can be connected to each pump diode source 53 and 63 to selectively turn on and off the respective pump sources to effectively turn on or off the respective amplifier arm. Of course, for the exemplary application of FIG. 2, wherein the amplifier 50 provides amplification over an unaccessible link, no controller 110 is employed. The amplifier 50 will include self-contained power components (such as a battery, not shown) to provide power to the amplifier pump sources 53 and 63.

The new bi-directional optical fiber amplifier in accordance with this invention offers the following advantages:

1) The two separate amplifier arms allow the optimization of signal amplification for the two counter-propagating signals.

2) The new amplifier scheme also offers a new feature as an in-line signal switch for cascaded fan-out distribution systems such as CATV or FTTH. The two counter-propagating pump sources can be switched on independently to serve as the signal switch for the bi-directional FODL without affecting another signal channel. When the pump source is turned off, the EDF provides absorptive loss to the signal instead of gain. This feature is not available from the single strand EDF bi-directional fiber amplifier of FIG. 1.

3) The two-arm EDF approach in accordance with this invention allows the pumped source to be positioned at the far end of the EDF to construct the amplifier in a counter-propagating pump scheme which improves the noise performance of the optical amplifier by reducing the required pump power.

The two-arm fiber amplifier of this invention is also applicable to another bi-directional optical amplifier design that uses semiconductor optical amplifiers in the place of fiber amplifiers. FIG. 3 illustrates an exemplary semiconductor optical amplifier 130 connected to optical fibers 140 and 150. The amplifier 130 comprises a plurality of layers or regions 132A-N, with the fibers 140 and 150 coupled to the active layer (gain region) 132C. The use of semiconductor amplifiers in optical fiber links is described, for example, in "Optical Fiber Telecommunications II," edited by S. E. Miller and I. P. Kaminow, Academic Press, Boston, Mass., 1988, at page 820 et seq.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A bi-directional optical fiber data transmission link for interconnecting a missile having a first optical signal means with a launch platform having a second optical signal means, said first and second optical signal means operating at different optical wavelengths, comprising first and second lengths of optical fibers, a first end of said first length of fiber coupled to said first optical signal means and a first end of said second length of fiber coupled to said second optical signal means, and a bi-directional optical amplifier for amplifying bi-directional optical signals simultaneously carried between said first and second signal means by a single transmission fiber channel comprising said first and second fiber lengths and said amplifier to compensate for optical losses incurred over said fiber channel, said amplifier comprising first and second input/output (I/O) ports, said first I/O port coupled to a second end of said first length of optical fiber, said second I/O port coupled to a second end of said second length of optical fiber, first and second signal routing wavelength division multiplexing (WDM) optical couplers respectively connected to said first and second I/O ports for maintaining separation between said signals of different optical wavelengths, and first and second separate optical signal amplifier channels connected between said first and second optical couplers for amplifying two respective counter-propagating signals at said different optical wavelengths.

2. The amplifier of claim 1 wherein said first amplifier channel comprises a first erbium-doped fiber (EDF) having first and second ends, and said second amplifier channel comprises a second EDF having first and second ends, said first amplifier channel further comprises a first pump laser source operating at said first wavelength and a first pump WDM coupler disposed at said second end of said first EDF for combining the optical signals from said first pump laser source with signals traversing said first EDF, said second amplifier channel further comprising a second pump laser source operating at said second wavelength and a second pump WDM coupler disposed at said second end of said second EDF for combining the optical signals from said second pump laser source with signals traversing said second EDF.

3. The amplifier of claim 2 further comprising a controller for controlling the operation of said first and second pump sources so as to selectively switch off or on said respective amplifier channels, thereby providing the capability of switched amplifier channels.

4. The amplifier of claim 1 wherein each said amplifier channel comprises a semiconductor optical amplifier.

5. A bi-directional optical fiber data transmission link for interconnecting a missile having a first optical signal means with a launch platform having a second optical signal means, said first and second optical signal means operating at different optical wavelengths, comprising first and second lengths of optical fibers, a first end of said first fiber length coupled to said first optical signal means, and a first end of said second fiber length coupled to said second optical signal means, and a bi-directional optical amplifier for amplifying bi-directional optical signals simultaneously carried by a single transmission fiber channel comprising said fiber lengths and said amplifier, said amplifier for compensating for optical losses in said fiber channel, said amplifier comprising first and second input/output (I/O) ports, said first I/O port coupled to a second end of said first optical fiber length, said second I/O port coupled to a second end of said second optical fiber length, first and second signal routing wavelength division multiplexing (WDM) optical couplers respectively connected to said first and second I/O ports for maintaining separation between said signals of different optical wavelengths, and first and second doped fiber amplifier separate channels connected between said first and second optical couplers for amplifying two respective counter-propagating signals at different wavelengths carried by said single transmission fiber channel.

6. The amplifier of claim 5 wherein said first amplifier channel comprises a first doped fiber having first and second ends, and said second amplifier channel comprises a second doped fiber having first and second ends, said first channel further comprises a first pump laser source operating at said first wavelength and a first pump WDM coupler disposed at said second end of said first doped fiber for combining the optical signals from said first pump laser source with signals traversing said first doped fiber, said second amplifier channel further comprising a second pump laser source operating at said second wavelength and a second pump WDM coupler disposed at said second end of said second doped fiber for combining the optical signals from said second pump laser source with signals traversing said second doped fiber.

7. The amplifier of claim 6 further comprising a controller for controlling the operation of said first and second pump source so as to selectively switch off or on said respective amplifier channels, thereby providing the capability of switched amplifier channels.

8. The amplifier of claim 5 wherein said first amplifier channel is optimized for operation at said first wavelength, and said second amplifier channel is optimized for operation at said second wavelength.

9. The amplifier of claim 6 wherein the length and dopant of said first doped fiber and the pump wavelength and power of said first pump source are optimized for a specific first wavelength value, and the length and dopant of said second doped fiber and the pump diode wavelength and power of said second pump source are optimized for a specific second wavelength value.

10. The amplifier of claim 6 wherein said first and second doped fibers are doped with erbium.

11. The amplifier of claim 6 wherein said first doped fiber is doped with erbium and said second doped fiber is doped with neodymium.

12. An optical fiber data link for interconnecting a missile with a launch platform, comprising:
first optical signal means disposed at or adjacent said launch platform, said first signal means comprising a first optical signal transmitter means operating at a first optical wavelength, a first signal receiving means operating at a second optical wavelength, and a first wavelength sensitive coupler coupled to said first transmitter and receiver for maintaining separation between signals of said first and second wavelengths;
second optical signal means disposed at said missile, said second signal means comprising a second optical signal transmitter means operating at a second optical wavelength, a second signal receiving means operating at said first wavelength, and a second wavelength sensitive coupler coupled to said second transmitter and receiver means for maintaining separation between signals of said first and second wavelengths;

an optical transmission fiber interconnecting said first and second optical signal means for carrying bi-directional optical signals between said first and second optical signal means, comprising a first length of optical fiber having a first end coupled to said first coupler and a second end coupled to a first input/output (I/O) port of a bi-directional optical amplifier, a second length of optical fiber having a first end coupled to said second coupler and a second end coupled to a second I/O port of said amplifier, and wherein said amplifier comprises first and second separate optical signal amplifier channels coupled between said first and second I/O ports for amplifying two respective counter-propagating amplifier signals at different optical wavelengths.

13. The optical fiber data link of claim 12 wherein said counter-propagating signals are at respective first and second different wavelengths $\lambda_1$ and $\lambda_2$, said amplifier further comprising means for maintaining separation between said signals of different wavelengths so that only signals of said first wavelength traverse said first amplifier channel and only signals of said second wavelength traverse said second amplifier channel.

14. The optical fiber data link of claim 13 wherein said first and second amplifier channels have first and second ends, and said amplifier further comprises first and second signal routing wavelength division multiplexing (WDM) optical couplers for separating the signals into signal components at said first and second wavelengths, said first coupler coupled to said first ends of said channels and said second coupler coupled to said second ends of said channels.

15. The optical fiber data link of claim 14 wherein said first amplifier channel comprises a first erbium-doped fiber (EDF) having first and second ends, and said second amplifier channel comprises a second EDF having first and second ends, said first channel further comprises a first pump laser source operating at said first wavelength and a first pump WDM coupler disposed at said second end of said first EDF for combining the optical signals from said first pump laser source with signals traversing said first EDF, said second amplifier channel further comprising a second pump laser source operating at said second wavelength and a second pump WDM coupler disposed at said second end of said second EDF for combining the optical signals from said second pump laser source with signals traversing said second EDF.

16. The fiber amplifier of claim 1 wherein said amplifier is spliced into said transmission fiber.

17. The amplifier of claim 5 wherein said amplifier is spliced into said transmission fiber.

18. The data link of claim 15 wherein the length and dopant of said first doped fiber and the pump wavelength and power of said first pump source are selected for operation at a specific first wavelength value, and the length and dopant of said second doped fiber and the pump wavelength and power of said second pump source are selected for operation at a specific second wavelength value.

19. The data link of claim 15 further comprising a controller for controlling the operation of said first and second pump sources so as to selectively switch off or on said respective amplifier channels, thereby providing the capability of switched amplifier channels.

* * * * *